(12) United States Patent
Monier et al.

(10) Patent No.: US 9,419,888 B2
(45) Date of Patent: Aug. 16, 2016

(54) CELL ROUTER FAILURE DETECTION IN A MESH NETWORK

(75) Inventors: Fabrice Monier, Bry-sur-Marne (FR); Jerome Bartier, Montrouge (FR); Hartman Van Wyk, Mont Louis sur Loire (FR)

(73) Assignee: Itron, Inc., Liberty Lake, WA (US)

( * ) Notice: Subject to any disclaimer, the term of this patent is extended or adjusted under 35 U.S.C. 154(b) by 1134 days.

(21) Appl. No.: 13/334,951

(22) Filed: Dec. 22, 2011

(65) Prior Publication Data
US 2013/0162441 A1 Jun. 27, 2013

(51) Int. Cl.
| | |
|---|---|
| *G01R 31/08* | (2006.01) |
| *H04L 12/28* | (2006.01) |
| *H04L 12/707* | (2013.01) |
| *H04L 12/26* | (2006.01) |
| *H04L 12/703* | (2013.01) |
| *H04W 40/22* | (2009.01) |
| *H04L 12/24* | (2006.01) |

(52) U.S. Cl.
CPC ............ *H04L 45/22* (2013.01); *H04L 43/0811* (2013.01); *H04L 45/28* (2013.01); *H04W 40/22* (2013.01); *H04L 41/064* (2013.01); *H04L 41/085* (2013.01)

(58) Field of Classification Search
CPC ..... H04W 40/22; H04W 40/24; H04W 56/00; H04W 40/02; H04W 40/18; H04W 24/00; H04W 24/10; H04W 24/06; H04W 24/08; H04W 84/18; H04W 84/30; H04J 3/0641; H04J 3/0685
USPC ......... 370/216–219, 220, 221, 242, 244, 245, 370/400, 401, 405, 406, 408, 252, 350, 503, 370/509, 510; 340/870.11, 870.02; 709/224; 455/436
See application file for complete search history.

(56) References Cited

U.S. PATENT DOCUMENTS

| | | |
|---|---|---|
| 4,799,062 A | 1/1989 | Sanderford, Jr. et al. |
| 4,977,577 A | 12/1990 | Arthur et al. |
| 4,998,102 A | 3/1991 | Wyler et al. |
| 5,067,136 A | 11/1991 | Arthur et al. |
| 5,095,493 A | 3/1992 | Arthur et al. |
| 5,119,396 A | 6/1992 | Snderford, Jr. |
| 5,198,796 A | 3/1993 | Hessling, Jr. |

(Continued)

FOREIGN PATENT DOCUMENTS

| | | |
|---|---|---|
| EP | 0984642 A2 | 3/2000 |
| GB | 2311191 A | 9/1997 |

(Continued)

OTHER PUBLICATIONS

Mario Catalani, "Polymatrix and Generalized Polynacci Numbers", Department of Economics, University of Torino, Torino, Italy, Oct. 14, 2002.
International Search Report and Written Opinion of the ISA for PCT International Application No. PCT/US07/20022 issued Jun. 26, 2008.
Jul. 3, 2013 Office Action for Canadian Patent Application No. 2,763,756.

(Continued)

*Primary Examiner* — Hanh N Nguyen

(57) ABSTRACT

The presently disclosed subject matter is directed to methodologies, apparatuses, and systems for providing cell router (relay) failure detection in a mesh network. Individual cell relays heading up cells within a mesh network transmit synchronization signals including as a portion thereof a counter value. Nodes with the cells monitor the counter value and search for a new connection to a central facility if the counter value fails to update within a predetermined value.

14 Claims, 2 Drawing Sheets

(56) References Cited

U.S. PATENT DOCUMENTS

| | | |
|---|---|---|
| 5,265,120 A | 11/1993 | Sanderford, Jr. |
| 5,310,075 A | 5/1994 | Wyler |
| 5,311,541 A | 5/1994 | Sanderford, Jr. |
| 5,377,222 A | 12/1994 | Sanderford, Jr. |
| 5,377,232 A | 12/1994 | Davidov et al. |
| 5,457,713 A | 10/1995 | Sanderford, Jr. et al. |
| 5,486,805 A | 1/1996 | Mak |
| 5,598,427 A | 1/1997 | Arthur et al. |
| 5,604,768 A | 2/1997 | Fulton |
| 5,626,755 A | 5/1997 | Keyser et al. |
| 5,661,750 A | 8/1997 | Fulton |
| 5,666,353 A | 9/1997 | Klausmeier et al. |
| 5,668,828 A | 9/1997 | Sanderford, Jr. et al. |
| 5,696,441 A | 12/1997 | Mak et al. |
| RE35,829 E | 6/1998 | Sanderford, Jr. |
| 5,920,589 A | 7/1999 | Rouquette et al. |
| 5,926,531 A | 7/1999 | Petite |
| 5,933,072 A | 8/1999 | Kelley |
| 5,953,368 A | 9/1999 | Sanderford et al. |
| 5,987,058 A | 11/1999 | Sanderford et al. |
| 6,028,522 A | 2/2000 | Petite |
| 6,031,883 A | 2/2000 | Sanderford, Jr. et al. |
| 6,044,062 A | 3/2000 | Brownrigg et al. |
| 6,047,016 A | 4/2000 | Ramberg et al. |
| 6,100,816 A | 8/2000 | Moore |
| 6,163,276 A | 12/2000 | Irving et al. |
| 6,178,197 B1 | 1/2001 | Froelich et al. |
| 6,181,258 B1 | 1/2001 | Summers et al. |
| 6,195,018 B1 | 2/2001 | Ragle et al. |
| 6,204,808 B1 | 3/2001 | Bloebaum et al. |
| 6,218,953 B1 | 4/2001 | Petite |
| 6,232,885 B1 | 5/2001 | Ridenour et al. |
| 6,233,327 B1 | 5/2001 | Petite |
| 6,246,677 B1 | 6/2001 | Nap et al. |
| 6,249,516 B1 | 6/2001 | Brownrigg et al. |
| 6,263,009 B1 | 7/2001 | Ramberg et al. |
| 6,335,953 B1 | 1/2002 | Sanderford, Jr. et al. |
| 6,363,057 B1 | 3/2002 | Ardalan et al. |
| 6,369,769 B1 | 4/2002 | Nap et al. |
| 6,377,609 B1 | 4/2002 | Brennan, Jr. |
| 6,396,839 B1 | 5/2002 | Ardalan et al. |
| 6,424,270 B1 | 7/2002 | Ali |
| 6,426,027 B1 | 7/2002 | Scarborough, III et al. |
| 6,430,268 B1 | 8/2002 | Petite |
| 6,437,692 B1 | 8/2002 | Petite et al. |
| 6,452,986 B1 | 9/2002 | Luxford et al. |
| 6,456,644 B1 | 9/2002 | Ramberg et al. |
| 6,538,577 B1 | 3/2003 | Ehrke et al. |
| 6,604,434 B1 | 8/2003 | Hamilton et al. |
| 6,612,188 B2 | 9/2003 | Hamilton |
| 6,617,879 B1 | 9/2003 | Chung |
| 6,617,976 B2 | 9/2003 | Walden et al. |
| 6,617,978 B2 | 9/2003 | Ridenour et al. |
| 6,618,578 B1 | 9/2003 | Petite |
| 6,626,048 B1 | 9/2003 | Dam Es et al. |
| 6,628,764 B1 | 9/2003 | Petite |
| 6,633,886 B1 | 10/2003 | Chong |
| 6,639,939 B1 | 10/2003 | Naden et al. |
| 6,650,249 B2 | 11/2003 | Meyer et al. |
| 6,657,552 B2 | 12/2003 | Belski et al. |
| 6,671,586 B2 | 12/2003 | Davis et al. |
| 6,700,902 B1 | 3/2004 | Meyer |
| 6,704,301 B2 | 3/2004 | Chari et al. |
| 6,734,663 B2 | 5/2004 | Fye et al. |
| 6,747,557 B1 | 6/2004 | Petite et al. |
| 6,747,981 B2 | 6/2004 | Ardalan et al. |
| 6,778,099 B1 | 8/2004 | Meyer et al. |
| 6,784,807 B2 | 8/2004 | Petite et al. |
| 6,816,538 B2 | 11/2004 | Shuey et al. |
| 6,836,108 B1 | 12/2004 | Balko et al. |
| 6,836,737 B2 | 12/2004 | Petite et al. |
| 6,850,197 B2 | 2/2005 | Paun |
| 6,859,186 B2 | 2/2005 | Lizalek et al. |
| 6,862,498 B2 | 3/2005 | Davis et al. |
| 6,867,707 B1 | 3/2005 | Kelley et al. |
| 6,885,309 B1 | 4/2005 | Van Heteren |
| 6,891,838 B1 | 5/2005 | Petite et al. |
| 6,900,737 B1 | 5/2005 | Ardalan et al. |
| 6,914,533 B2 | 7/2005 | Petite |
| 6,914,893 B2 | 7/2005 | Petite |
| 6,918,311 B2 | 7/2005 | Nathan |
| 6,931,445 B2 | 8/2005 | Davis |
| 6,940,396 B2 | 9/2005 | Hammond et al. |
| 6,965,575 B2 | 11/2005 | Srikrishna et al. |
| 6,972,555 B2 | 12/2005 | Balko et al. |
| 6,982,651 B2 | 1/2006 | Fischer |
| 7,046,682 B2 | 5/2006 | Carpenter et al. |
| 7,054,271 B2 | 5/2006 | Brownrigg et al. |
| 7,103,511 B2 | 9/2006 | Petite |
| 7,126,494 B2 | 10/2006 | Ardalan et al. |
| 7,251,570 B2 * | 7/2007 | Hancock ............... H04B 7/2606 702/57 |
| 7,965,758 B2 | 6/2011 | Picard |
| 7,995,467 B2 * | 8/2011 | Fitch et al. .................... 370/221 |
| 8,054,821 B2 * | 11/2011 | Monier et al. ................ 370/350 |
| 8,059,011 B2 * | 11/2011 | Van Wyk et al. ......... 340/870.11 |
| 8,138,934 B2 * | 3/2012 | Veillette .................... G06F 1/30 340/635 |
| 8,301,145 B2 * | 10/2012 | Deivasigamani et al. .... 455/436 |
| 8,423,637 B2 * | 4/2013 | Vaswani et al. ............... 709/224 |
| 8,441,987 B2 * | 5/2013 | Monier et al. ................ 370/328 |
| 2002/0019725 A1 | 2/2002 | Petite |
| 2002/0037716 A1 | 3/2002 | McKenna et al. |
| 2002/0146985 A1 | 10/2002 | Naden |
| 2002/0169643 A1 | 11/2002 | Petite et al. |
| 2002/0183070 A1 | 12/2002 | Bloebaum et al. |
| 2002/0186000 A1 * | 12/2002 | Briese et al. .................. 324/142 |
| 2003/0001754 A1 | 1/2003 | Johnson et al. |
| 2003/0048199 A1 | 3/2003 | Zigdon et al. |
| 2003/0063723 A1 | 4/2003 | Booth et al. |
| 2003/0078029 A1 | 4/2003 | Petite |
| 2003/0093484 A1 | 5/2003 | Petite |
| 2003/0103486 A1 | 6/2003 | Salt et al. |
| 2003/0179149 A1 | 9/2003 | Savage et al. |
| 2004/0004555 A1 | 1/2004 | Martin |
| 2004/0008663 A1 | 1/2004 | Srikrishna et al. |
| 2004/0040368 A1 | 3/2004 | Guckenberger et al. |
| 2004/0053639 A1 | 3/2004 | Petite et al. |
| 2004/0061623 A1 | 4/2004 | Tootoonian Mashhad et al. |
| 2004/0062224 A1 | 4/2004 | Brownrigg et al. |
| 2004/0085928 A1 | 5/2004 | Chari et al. |
| 2004/0088083 A1 | 5/2004 | Davis et al. |
| 2004/0131125 A1 | 7/2004 | Sanderford, Jr. et al. |
| 2004/0161018 A1 | 8/2004 | Maric |
| 2004/0183687 A1 | 9/2004 | Petite et al. |
| 2004/0192415 A1 | 9/2004 | Luglio et al. |
| 2004/0218616 A1 | 11/2004 | Ardalan et al. |
| 2004/0264379 A1 | 12/2004 | Srikrishna et al. |
| 2004/0264435 A1 | 12/2004 | Chari et al. |
| 2005/0018751 A1 | 1/2005 | Roy et al. |
| 2005/0024235 A1 | 2/2005 | Shuey et al. |
| 2005/0030199 A1 | 2/2005 | Petite et al. |
| 2005/0036487 A1 | 2/2005 | Srikrishna |
| 2005/0043059 A1 | 2/2005 | Petite et al. |
| 2005/0043860 A1 | 2/2005 | Petite |
| 2005/0052290 A1 | 3/2005 | Naden et al. |
| 2005/0052328 A1 | 3/2005 | De Angelis |
| 2005/0068970 A1 | 3/2005 | Srikrishna et al. |
| 2005/0074015 A1 | 4/2005 | Chari et al. |
| 2005/0088966 A9 | 4/2005 | Stewart |
| 2005/0129005 A1 | 6/2005 | Srikrishna et al. |
| 2005/0147097 A1 | 7/2005 | Chari et al. |
| 2005/0163144 A1 | 7/2005 | Srikrishna et al. |
| 2005/0169020 A1 | 8/2005 | Knill |
| 2005/0171696 A1 | 8/2005 | Naden et al. |
| 2005/0172024 A1 | 8/2005 | Cheifot et al. |
| 2005/0190055 A1 | 9/2005 | Petite |
| 2005/0195768 A1 | 9/2005 | Petite et al. |
| 2005/0195775 A1 | 9/2005 | Petite et al. |
| 2005/0201397 A1 | 9/2005 | Petite |
| 2005/0218873 A1 | 10/2005 | Shuey et al. |
| 2005/0226179 A1 | 10/2005 | Behroozi |
| 2005/0243867 A1 | 11/2005 | Petite |
| 2005/0251401 A1 | 11/2005 | Shuey |

(56) References Cited

U.S. PATENT DOCUMENTS

| | | |
|---|---|---|
| 2005/0251403 A1 | 11/2005 | Shuey |
| 2005/0270173 A1 | 12/2005 | Boaz |
| 2005/0271006 A1 | 12/2005 | Chari et al. |
| 2005/0278440 A1 | 12/2005 | Scoggins |
| 2006/0002350 A1 | 1/2006 | Behroozi |
| 2006/0012935 A1 | 1/2006 | Murphy |
| 2006/0013263 A1 | 1/2006 | Fellman |
| 2006/0018303 A1 | 1/2006 | Sugiarto et al. |
| 2006/0038548 A1 | 2/2006 | Shuey |
| 2006/0043961 A1 | 3/2006 | Loy |
| 2006/0071810 A1 | 4/2006 | Scoggins et al. |
| 2006/0071812 A1 | 4/2006 | Mason, Jr. et al. |
| 2006/0195610 A1 | 8/2006 | Cole et al. |
| 2006/0203707 A1 | 9/2006 | Lee et al. |
| 2006/0209878 A1 | 9/2006 | Nelson |
| 2006/0274791 A1 | 12/2006 | Garcia et al. |
| 2007/0025398 A1 | 2/2007 | Yonge et al. |
| 2008/0068215 A1 | 3/2008 | Stuber et al. |
| 2008/0068989 A1 | 3/2008 | Wyk et al. |
| 2008/0089390 A1 | 4/2008 | Picard |
| 2009/0092148 A1 | 4/2009 | Zhang et al. |
| 2009/0122810 A9 | 5/2009 | Jin et al. |
| 2009/0252032 A1 | 10/2009 | Jiang et al. |
| 2010/0152910 A1* | 6/2010 | Taft ............................... 700/286 |
| 2010/0238855 A1 | 9/2010 | Yoshida et al. |
| 2011/0280178 A1* | 11/2011 | Heifner ......................... 370/325 |

FOREIGN PATENT DOCUMENTS

| | | |
|---|---|---|
| WO | 2005010214 A2 | 2/2005 |
| WO | WO 2006/083696 A2 | 8/2006 |
| WO | WO 2006/096854 A2 | 9/2006 |

OTHER PUBLICATIONS

Feb. 7, 2013 Office Action for Canadian Patent Application No. 2,763,756.

Mar. 26, 2014 Office Action issued in Canadian Patent Application No. 2,763,756.

Canadian Patent Application No. 2,763,756 Office Action dated Apr. 26, 2012.

PCT International Search Report and PCT Written Opinion of the International Searching Authority for PCT International Application No. PCT/US12/70552 completed Feb. 15, 2013, mailed Mar. 4, 2013.

PCT International Preliminary Report on Patentability for PCT International Application No. PCT/US2012/070552 issued Jun. 24, 2014.

PCT Written Opinion of the International Searching Authority for PCT International Application No. PCT/US12/70552 completed Feb. 15, 2013.

Extended European Search Report for European Application No. 12860099.6, dated Jun. 23, 2015, 9 pages.

Yu et al., "GROUP: A Grid-Clustering Routing Protocol for Wireless Sensor Networks," International Conference on Wireless Communications, Networking and Mobile Computing, WiCOM 2006, Sep. 22-24, 2006, IEEE, pp. 1-5.

Canadian Office Action mailed Oct. 2, 2015, for Canadian Patent Application No. 2,763,756, 10 pages.

Yang, Guu-Chang, "Partitioning Frequency-Hopping Codes for CDMA Cellular Systems," Proceedings of IEEE INFOCOM 1996, The Conference on Computer Communications, Fifteenth Annual Joint Conference of the IEEE Computer and Communications Societies, Networking the Next Generation, San Francisco, CA, USA, Mar. 24-28, 1996, vol. 2, IEEE 1996, pp. 457-463.

Dec. 5, 2013 Office Action for Canadian Patent Application No. 2,763,756.

* cited by examiner

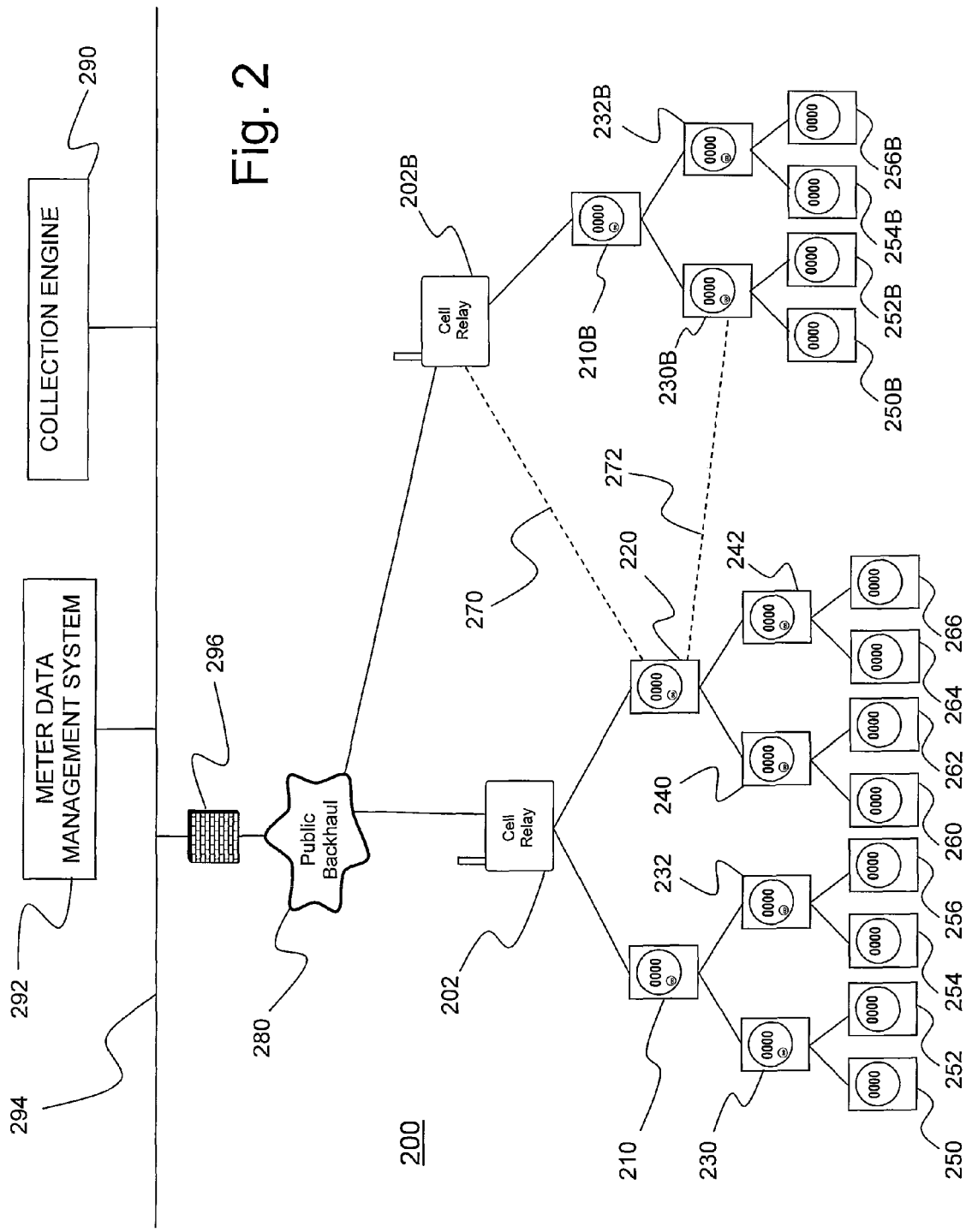

CELL ROUTER FAILURE DETECTION IN A MESH NETWORK

FIELD OF THE SUBJECT MATTER

The presently disclosed subject matter relates to information management within automated metering infrastructure (AMI) architecture. More particularly, the presently disclosed subject matter relates to improvements in cell router failure detection through provision of a counter functionality within a cell router synchronization signal in an automated metrology infrastructure (AMI) environment.

BACKGROUND OF THE SUBJECT MATTER

Automatic meter reading (AMR) systems are generally known in the art. Utility companies, for example, use AMR systems to read and monitor customer meters remotely, typically using radio frequency (RF) communication. AMR systems are favored by utility companies and others who use them because they increase the efficiency and accuracy of collecting readings and managing customer billing. For example, utilizing an AMR system for the monthly reading of residential gas, electric, or water meters eliminates the need for a utility employee to physically enter each residence or business where a meter is located to transcribe a meter reading by hand.

There are several different ways in which some current AMR systems are configured, including fixed network and mobile network systems. In a fixed network, encoder-receiver-transmitter (ERT) type endpoint devices at meter locations communicate with readers that collect readings and data using RF communication. There may be multiple fixed intermediate readers located throughout a larger geographic area on utility poles, for example, with each endpoint device associated with a particular reader and each reader in turn communicating with a central system. Other fixed systems can utilize a system including repeaters or relay devices that expand the coverage area for each reader, cell control units (CCUs) that concentrate data and forward the same on to the system head end using a wide area network (WAN), or other suitable communication infrastructure. In simple fixed systems, only one central reader may be utilized with all of the endpoint devices. In a mobile network AMR environment, a handheld, vehicle-mounted, or otherwise mobile reader device with RF communication capabilities is used to collect data from endpoint devices as the mobile reader is moved from place to place.

One design criterion for utility meter reading systems involves meter data management (MDM) systems that generally involve a centralized processing model. Such centralized processing models, however, are subject to various problems including, but not limited to, system performance, scalability, data latency, fault tolerance, complexity, infrastructure cost, and batch processing issues.

For example, performance throughput and scalability can generally only be maintained by providing parallel processing technology. Data latency is becoming more of an issue as expectations are rapidly approaching real-time. Fault tolerance requirements demand that sufficient computing power, including provision of disaster recovery sites, be provided. A whole host of concerns arise from commonly used centralized solutions including complexity, the high cost of powerful computer infrastructure, and the inherent requirements imposed on centralized solutions from batch processing of data and other infrastructure communications requirements.

In view of such concerns, it would be advantageous, therefore, to provide methodologies and associated apparatuses/devices wherein failure of critical components may be quickly identified.

SUMMARY OF THE SUBJECT MATTER

In view of the recognized features encountered in the prior art and addressed by the presently disclosed subject matter, improved methodology, apparatus, and systems are provided for detecting cell relay failure in a mesh network.

In one present exemplary embodiment, the presently disclosed subject matter broadly speaking relates to methodology for providing cell router failure detection. In such methodology, a value based on a value received from a cell relay is periodically updating, compared to a previously received value, and determines whether communications with the cell relay have failed based on the results of such comparison. In selected embodiments, the value may be a numeric value or a time value. In such exemplary embodiments, the value may be received by the node as a portion of a synchronization frame.

In instances where the value is a numeric value, exemplary present methodology may call for determination of whether communications with the cell relay have failed by determining whether the numerical value has changed within a predetermined period of time.

In other embodiments, the value corresponds to a time value and the exemplary methodology may in those instances determine whether communications with the cell relay have failed by determining whether the time value has changed within a predetermined period of time.

In certain of the foregoing presently disclosed exemplary methodologies, the cell relay may be operative in a mesh network associated with a collection engine, other such cell relays, and a plurality of associated nodes. Still further, in some such methodologies, at least some of the associated nodes may be respectively associated with metering endpoints, and the collection engine may be operative for collecting metering data from such metering endpoints.

The presently disclosed subject matter equally relates to both methodology and associated or corresponding apparatus/device subject matter. For example, another presently disclosed exemplary embodiment may relate to network enabled node devices. In such embodiments, an exemplary such node device may include a counter configured to be updated based on a received network signal, a comparator configured to compare a counter value with a previous counter value, and a processor configured to search for network access based on results of a comparison of the counter value and a previous counter value.

In selected such embodiments, the exemplary counter may be updated based on a portion of a network synchronization frame. In certain embodiments, such portion may contain a numerical value while in other embodiments such portion may contain a time value.

In some presently disclosed exemplary embodiments, the processor may search for network access if the counter fails to be updated within a predetermined time period while in other embodiments, the processor may search for network access if the time value has not changed within a predetermined period of time.

In other presently disclosed exemplary embodiments of the foregoing, such device may be configured for operation with a mesh network having a data collection engine, at least one cell relay, and a plurality of such node devices.

Various presently disclosed exemplary embodiments also may relate to a mesh network. In such embodiments, an exemplary such mesh network may comprise a collection engine, at least two cell relays, and at least one node respectively associated with each of the at least two cell relays. In such embodiments, the at least one node respectively associated with each of the at least two cell relays forms with its associated cell relay a cell within the network. In such arrangements, the cell relays preferably transmit synchronization signals including at least a counter value to nodes within their own cell. Such nodes monitor the counter value and search for network access to the collection engine upon failure to receive updated counter values from its associated cell relay within a predetermined time period.

In selected such embodiments, an exemplary cell relay may transmit a numeric counter value, while in other embodiments an exemplary cell relay may transmit a time counter value. In certain specific embodiments, an exemplary node may be forbidden (or prevented) from searching within the cell of its previously associated cell relay during a predetermined time period.

In still other of the foregoing exemplary embodiments, at least some of the associated nodes may be respectively associated with metering endpoints, and the collection engine may be operative for collecting metering data from such metering endpoints.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which:

FIG. 2 is a block diagram overview illustrating, in part, portions of a known Advanced Metering System (AMS) with which are otherwise practiced devices in which the presently disclosed subject matter may be incorporated.

Figure 1:
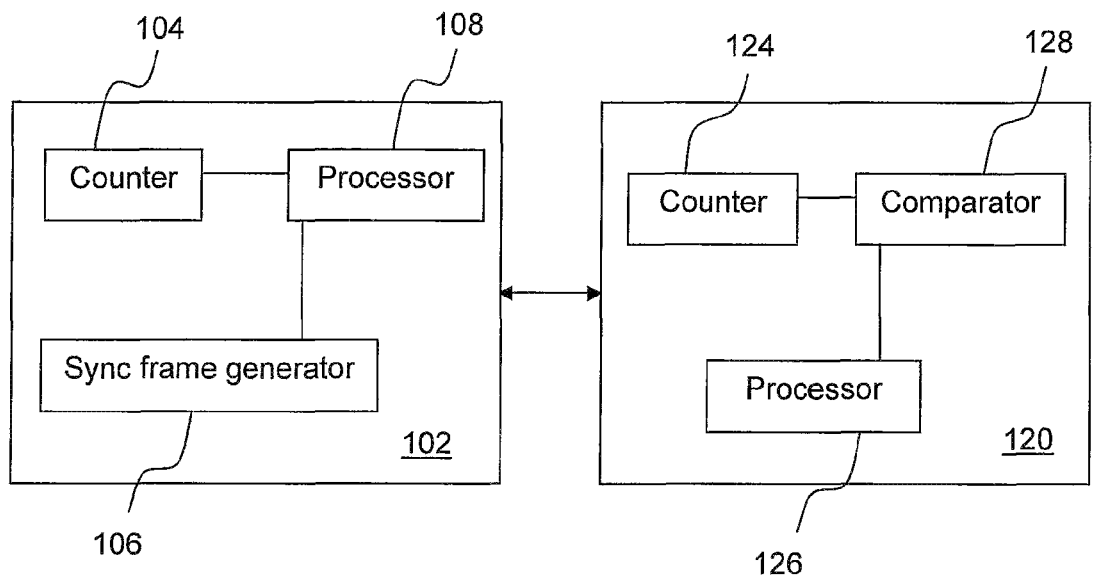
FIG. 1 illustrates partial block diagrams of a representative cell relay (router) and a representative node (meter device) constructed in accordance with the presently disclosed subject matter.

Repeat use of reference characters throughout the present specification and appended drawings is intended to represent same or analogous features, elements, or steps of the presently disclosed subject matter.

DETAILED DESCRIPTION OF THE PREFERRED EMBODIMENTS

As discussed in the Summary section, the presently disclosed subject matter is particularly concerned with methodologies (and associated and/or corresponding apparatus/device subject matter) for providing improvements in cell router failure detection through provision of a counter functionality within a cell router synchronization signal in an automated metrology infrastructure (AMI) environment. With initial reference to FIG. 2, there is illustrated a block diagram overview illustrating, in part, a known Advanced Metering System (AMS) 200 illustrating the use of a centralized meter data management system 292. The known portions of such FIG. 2 illustration primarily relate to the middle and left sides thereof, coupled with the public backhaul and related connections to the collection engine, as described in commonly owned published US Patent Application Publication No. 20080068215 A1, the complete disclosure of which is fully incorporated herein by reference for all purposes.

FIG. 2 illustrates for exemplary purposes only a first RF LAN cell, with multiple member nodes organized into three levels. In such exemplary arrangement/system, respective meter devices (or metering endpoints) 210, 220, 230, 232, 240, 242, 250, 252, 254, 256, 260, 262, 264, 266, Cell Relay 202, and Collection Engine 290, preferably may have C12.22 network addresses. In the illustrated representation, meter data management system 292 is implemented so as to communicate over the Utility LAN 294 to Collection Engine 290 via Web Services. Communications between Cell Relay 202 and Utility LAN 294 in the illustrated representative arrangement variously involve Public Backhaul 280 and firewall 296.

In such configuration, the meter data acquisition process begins with the Meter Data Management System 292 initiating a request for data. Such operation is done through a web services call to Collection Engine 290 and may be performed without knowledge of the configured functionality of the variously associated end devices. Collection Engine 290 analyzes the request for data (such as metering data from the respective metering endpoints), and formulates a series of multicast (or broadcast) data requests. Such requests may then be sent out either directly to the device, or to Cell Relay 202 that relays the message out to all appropriate nodes. Broadcast and multicast messages may be sent by Cell Relay 202 to all members of the cell, such as by either an AMS RF LAN-level broadcast, or by the Cell Relay 202 repeating the message.

In instances when a message is broadcast, multicast, or specifically addressed to an individual network node (meter), a protocol stack for the RF LAN may advantageously take the message and construct a node path for the message to take before actually transmitting the packet. Such pre-constructed node path allows Cell Relay 202 to push a message down through the tree of the cell without creating redundant radio messages.

As may be seen from the foregoing, all messages between the various meter devices 210, 220, 230, 232, 240, 242, 250, 252, 254, 256, 260, 262, 264, 266, Cell Relay 202, and Collection Engine 290 may pass in both directions through Cell Relay 202. Thus, it may be seen that any failure occurring at Cell Relay 202 may have a serious impact on communications (in either direction) between the various meter devices and Collection Engine 290.

In accordance with the presently disclosed subject matter, and as more fully explained herein, if Cell Relay 202 fails and there are no other changes, the various meter devices 210, 220, 230, 232, 240, 242, 250, 252, 254, 256, 260, 262, 264, 266 will not be able to communicate with collection engine 290. During normal operation of the various meter devices (nodes), such nodes may not immediately realize that Cell Relay 202 has failed, but when they do so realize, they will try to find alternate routes through other nodes in close proximity to each other.

In the present exemplary configuration and with further reference to FIG. 2, if, for example, meter 220 realizes that Cell Relay 202 has failed, or, more particularly, that communications with the collection engine can not be carried out, such meter may attempt connections with an adjacent meter or, alternatively, with a cell headed up by another cell relay (for example, representative Cell Relay 202B). In such instances, meter (node) 220 may attempt to connect via path 270 directly to Cell Relay 202B or to another meter (node), for example device 230B, by way of path 272. Alternatively, meter 220 may attempt to connect to any of the meter devices (nodes) 210B, 230B, 232B, 250B, 252B, 254B, or 256B of alternate cell or cells in an effort to regain communications capability with collection engine 290. Such a process or approach of attempting to find a new connection path may actually take quite a while in very densely populated meter environments.

With present reference to subject FIG. 1, there are illustrated partial block diagrams of a Cell Relay 102 (router) and a meter device (node) 120 constructed in accordance with the presently disclosed subject matter. The presently disclosed subject matter corresponds to a failsafe mechanism whose implementation guarantees a maximum time after failure of the cell relay or router to which a node is assigned in which a meter (node) starts looking for another router (cell relay). The maximum time may be defined by the user (that is, the utility company) that owns or administers the meter.

As illustrated in FIG. 1, Cell Relay 102 may include a counter 104 that is periodically incremented by the router, generally (although not necessarily) by way of commands from processor 108. The count from counter 104 is propagated through the network with each synchronizing frame from synchronization frame generator 106. Those of ordinary skill in the art will appreciate that counter 104 and sync frame generator 106 may correspond to hardware and/or software within Cell Relay 102 and, if embodied as software may be stored in a memory associated with processor 108 by which the software is run.

Network nodes, such as node 120, upon receiving a synchronization frame including the associated count value, may have their own counter 124 updated. If such updated counter value is higher than the last count value received by the node, and if the period of time between any currently received count value and the last count value heard does not exceed a predetermined time limit, the node determines that its cell relay (router) is still active. On the other hand, if no update to the counter is received within a predetermined time period, the node will conclude that its Cell Relay (for example, such as Cell Relay 202 of FIG. 2) has failed or is otherwise out of service due, for example, to loss of contact with the cell relay, and such node will begin in accordance with presently disclosed subject matter to search for another available Cell Relay.

During such searches, the node associated with the old cell relay (router) is forbidden (prevented) from searching within the cell of its previously associated cell relay during a predetermined time period. Such time period preferably amounts to a window defined such that the window is long enough for all the nodes to realize the counter update has not occurred. Thus, for example, if node (meter) 220 loses contact with its cell relay 202, all nodes associated with cell relay 202 (including meters 210, 230, 232, 240, 242, 250, 252, 254, 256, 260, 262, 264, and 266) are excluded as possible new communications partners. In such way, node 220 is forced to seek out, for example, cell relay 202B or nodes (meters) associated with cell relay 202B including, exemplary node 230B.

Figure 3:
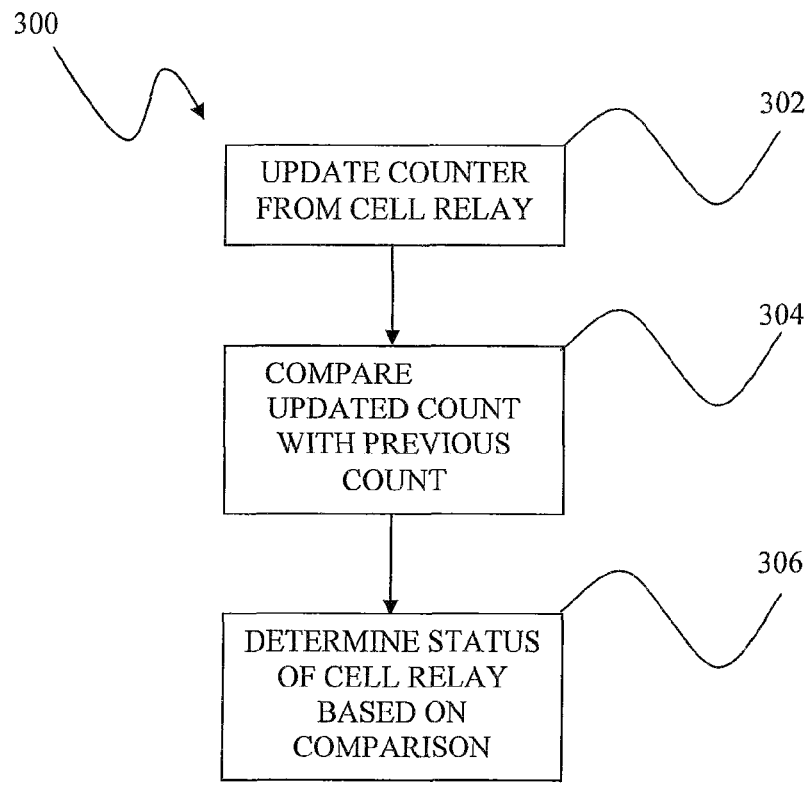
FIG. 3 is a flow chart illustrating exemplary presently disclosed methodology for providing cell router (or relay) failure detection.

With present reference to subject FIG. 3, there is presented a flow chart generally 300 illustrating an exemplary method for providing cell router failure detection in accordance with presently disclosed subject matter. As illustrated, an exemplary method in accordance with the presently disclosed subject matter calls for, in step 302, updating a counter (value) based on a count (value) received from a cell relay. Such counts or values are received by the individual nodes (meters) currently associated with a particular cell relay.

At step 304 the updated count received is compared to a previously received count (value) and then in step 306 a determination is made as to whether the associated cell relay has failed based on the results of the comparison. Such comparisons may take into consideration the differences in numeric values of the updated and previous counts, and in some instances may consider whether the numeric values have actually changed within a predetermined time period. In some instances, the numeric values may correspond to a time value. In such manner, if the previously stored count is found to not have changed for some predetermined time, or if a time value received from the cell relay differs significantly from a time value stored at the node (meter), a determination may be made in accordance with the presently disclosed subject matter that the cell relay has failed. In such instances, the node (meter) may then attempt to connect with the network by a different path.

In some exemplary configurations, the presently disclosed subject matter may be used to reduce the time required for nodes to associate with a new cell to, for example, about thirty minutes following failure or otherwise loss of contact with their previously associated cell, as compared to as much as several hours absent implementation of the presently disclosed subject matter. It should be appreciated that the time frame to begin a search may be controlled in part based on the count and time comparison conducted by comparator 128, for example, incorporated into node 120.

While the presently disclosed subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the presently disclosed subject matter as would be readily apparent to one of ordinary skill in the art.

What is claimed is:

1. A method for providing cell router failure detection in a mesh network for collection of metering data, comprising:

periodically updating, by a processor, a stored value based on a value received from a cell relay;

comparing, by a comparator communicatively coupled with the processor, a newly received value from the cell relay with the stored value, wherein the stored value was previously received from the cell relay and the newly received value is an update to the stored value; and determining, by the processor, whether communications with the cell relay have failed based on the results of the comparison, wherein communications with the cell relay is indicated as having failed based on a determination that the stored value has not changed within a predetermined period of time.

2. A method as in claim 1, wherein the value received from the cell relay is received as a counter portion of a synchronization frame.

3. A method as in claim 1, wherein the stored value corresponds to a numerical count value.

4. A method as in claim 1, wherein the stored value corresponds to a time value.

5. A method as in claim 1, wherein the mesh network is associated with a collection engine, and a plurality of other cell relays and associated nodes.

6. A method as in claim 5, wherein at least some of the associated nodes are respectively associated with metering endpoints, and the collection engine is operative for collecting metering data from such metering endpoints.

7. A method as in claim 1, wherein an indication that communications with the cell relay has failed is further based on a significance of a numerical difference in value of the stored value and the newly received value.

8. A network enabled node device for collection of metering data, comprising:

a counter configured to be updated based on a received network signal;

a comparator configured to compare an updated counter value with a previous counter value; and a processor configured to search for network access if results of a comparison of said updated counter value and said previous counter value shows that said counter fails to have a change in value within a predetermined time period.

9. A device as in claim 8, wherein said counter is updated based on a portion of a network synchronization frame.

10. A device as in claim 9, wherein said portion contains a numerical value.

11. A device as in claim 10, wherein the numerical value corresponds to a time value.

12. A device as in claim 11, wherein said processor searches for network access if the time value has not changed within a predetermined period of time.

13. A device as in claim 8, wherein said device is configured for operation with a mesh network having a data collection engine, at least one cell relay, and a plurality of said node devices.

14. A device as in claim 8, wherein the processor is further configured to search for network access if results of the comparison of said updated counter value and said previous counter value show a significance of a numerical difference between the updated counter value and the previous counter value.

* * * * *